US012489239B2

(12) United States Patent
Dullin

(10) Patent No.: US 12,489,239 B2
(45) Date of Patent: Dec. 2, 2025

(54) LOCKING ZONE FOR A PLUG CONTACT ELEMENT

(71) Applicant: Amphenol-Tuchel Electronics GmbH, Heilbronn (DE)

(72) Inventor: Claus Dullin, Bad Rappenau (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 416 days.

(21) Appl. No.: 18/022,108

(22) PCT Filed: Aug. 18, 2021

(86) PCT No.: PCT/EP2021/072904
§ 371 (c)(1),
(2) Date: Feb. 17, 2023

(87) PCT Pub. No.: WO2022/038173
PCT Pub. Date: Feb. 24, 2022

(65) Prior Publication Data

US 2023/0307861 A1 Sep. 28, 2023

(30) Foreign Application Priority Data

Aug. 21, 2020 (DE) ......................... 102020121969.5

(51) Int. Cl.
*H01R 13/422* (2006.01)
*H01R 13/20* (2006.01)
(Continued)

(52) U.S. Cl.
CPC ........... *H01R 13/422* (2013.01); *H01R 13/20* (2013.01); *H01R 13/53* (2013.01); *H01R 43/16* (2013.01)

(58) Field of Classification Search
CPC .. H01R 13/04–08; H01R 13/20; H01R 13/53; H01R 43/16
(Continued)

(56) References Cited

U.S. PATENT DOCUMENTS 4,979,915 A * 12/1990 Pitts ....................... H01R 13/04 439/595
6,217,379 B1 * 4/2001 D'Hulster .............. H01R 13/04 439/877
(Continued)

FOREIGN PATENT DOCUMENTS

DE 9417197 U1 3/1995

OTHER PUBLICATIONS

International Search Report & Written Opinion for International Application No. PCT/EP2021/072904; International Filing Date: Aug. 18, 2021; Date of Mailing: Nov. 23, 2021; 4 pages.

*Primary Examiner* — Abdullah A Riyami
*Assistant Examiner* — Amara Anderson
(74) *Attorney, Agent, or Firm* — CANTOR COLBURN LLP

(57) ABSTRACT

The invention relates to a locking zone for a plug contact element with a contact blade for producing an electrically conductive connection, having at least one first and one second locking element, wherein the first locking element is formed by a tongue and the second locking element is formed by a recess, the elements of the locking zone being geometrically matched to one another such that the tongue can engage in the recess and can be supported in the recess in a locking position of the plug contact element. The invention furthermore relates to a plug contact element having a locking zone.

14 Claims, 6 Drawing Sheets

(51) Int. Cl.
*H01R 13/53* (2006.01)
*H01R 43/16* (2006.01)

(58) Field of Classification Search
USPC .......................................................... 439/595
See application file for complete search history.

(56) References Cited

U.S. PATENT DOCUMENTS

| | | | | |
|---|---|---|---|---|
| 10,128,600 | B2 | 11/2018 | Yu et al. | |
| 2002/0002011 | A1 | 1/2002 | Shirouzu et al. | |
| 2003/0199211 | A1 | 10/2003 | Fukatsu et al. | |
| 2015/0364857 | A1 | 12/2015 | Endo et al. | |
| 2018/0159256 | A1* | 6/2018 | Yu .......................... | H01R 13/04 |

* cited by examiner

LOCKING ZONE FOR A PLUG CONTACT ELEMENT

CROSS REFERENCE TO RELATED APPLICATIONS

This application is a National Stage application of PCT/EP2021/072904, filed Aug. 18, 2021, which claims priority to German Patent Application Serial No. 102020121969.5, filed Aug. 21, 2020, both of which are incorporated by reference in their entirety herein.

FIELD

The invention relates to a locking zone for a plug contact element with a contact blade for producing an electrically conductive connection, having at least one first and one second locking element. The invention furthermore relates to a plug contact element with a locking zone.

BACKGROUND

Electrical contact elements, contact arrangements, mateable and releasable cable connecting elements and suitable production methods for these are available in different variations and designs in the known prior art. Socket or plug contact elements, as one of many options for realizing contacting systems, may be designed as crimp contacts based on usually flat original semi-finished products. In connection techniques for electrical contacting tasks, crimp contacts are configured as elements with tabs, whereof the tab ends are bent around the electrical conductor and simultaneously crimped therewith.

The electrically conductive contacting partners found in the prior art have different geometrical designs and dimensions. Such mating elements may be designed, for example, as mutually mating-compatible partners with a circular, flat or angled cross section. Circular plug contacts refer to plug contact pins; the geometry with a flat design is often referred to as a connector blade or flat connector.

Known methods for producing contacting components are, in particular, punching and forming processes based on a flat original material. The flat material here is suitably provided with contours, which facilitate the shaping process for producing the contacting element and its defined functions. The flat semi-finished product provided in this way is then developed in one or more forming steps. Possible forming procedures may be realized by folding, bending, pressing, deep-drawing or the like.

Other production options for contacting elements may involve sintering procedures, additive manufacturing methods or machining or cutting processes.

Combining the methods of punching and forming a flat original material is an economical and reliable way of providing contacting components in large numbers, but restricts the integration of various functions in one-piece contacting components due to the limited geometrical shape. These are, however, very suitable for plug contacts in the form of pins or blades.

Various solutions have been proposed to enable plug contacts with flat or blade-like geometries to be reliably held or arrested in the mating position, and to allow possible tensile forces, transverse loads or eccentric force effects to be absorbed by the plug connection.

A frequently realized approach is based on the idea of generating high contact forces between the contact partners; however, these hinder the mating and contacting movement.

DE 10 2018 131 378 A1 proposes a contacting system with a busbar in the form of a connector blade and a compatible connector fitting, the connector housings of which are equipped with pins and a clamping bracket. The clamping bracket is pivotable and cooperates with the pins in such a way that, by pivoting the clamping bracket from an unlocking position into a locking position, the pins of the respective connector housing are drawn towards the axis of rotation and the two plug contacts are thus arranged in their contact position. In this way, high mating forces are also overcome and the locking bracket holds the contact elements in the contacting position. However, the increased installation and removal effort and higher costs due to the multiple parts used in this solution are disadvantageous.

DE 2 020 077 A is concerned with improving the failure proneness of flat plug connectors and, in particular, the arresting action for secure mating. A flat contact in the form of a contact blade for electrical line connections is proposed, consisting of an electrically conductive contact strip with a latching projection which projects resiliently outwards and via which the strip, during its insertion into a recess of an insulation body, may be anchored in a stop position by means of a snap connection. The reliable arresting of the contact blade is achieved in that the contact strip has at least one longitudinal material opening, which is surrounded by the strip material on all sides and between the end faces of which the strip material is designed to project outwards in the form of the resilient latching projection, at least on one side, and can be deflected—at least with its protruding portion—into the opening.

The subject matter of DE 10 2015 216 632 A1 relates to an arrangement for producing an electrical connection between a flat contact and a high voltage conductor, wherein the arrangement has a holding structure, which has a connecting portion with a fastening means for fixing to a contacting portion of the high voltage conductor and a receptacle for the flat contact. A high current conductor with a compacted end is furthermore presented. The holding structure has a contact pressure member, which is configured to generate a contact pressure in the direction of the connecting portion. For the high current conductor, it is provided that the compacted end is connected to a plate-shaped connecting part in a force-fitting and/or materially bonded manner, wherein the connecting part has a contacting side, facing away from the compacted end, with at least one contacting element, of which some portions extend away from the connecting part.

In order to produce a reliable contacting situation, DE 10 2017 220 778 A2 discloses a contact element for a flat contact connector or contact blade with one or two lamella devices. The contact element has a contact body, which comprises a contacting portion, wherein the contacting portion has an insertion opening for inserting the flat contact along at least one insertion direction and a contacting unit with two lamella devices for contacting the flat contact in the inserted state in the contacting portion. The two lamella devices in the contacting portion are arranged opposite one another in a contacting direction transverse to the insertion direction and delimit an insertion space. Each lamella device has a frame region and a plurality of contact lamellae, wherein the contact lamellae are arranged on the frame region and project, with their free ends, into an inner region of the lamella device, which inner region is surrounded by the frame region. The contact lamellae have defined contacting points for contacting the flat contact, wherein the contact lamellae are arranged relative to one another, and spaced from one another, in such a way that, with a projection of the contacting points along the insertion direction in a widthways direction, transverse to the insertion direction and transverse to the contacting direction, all contacting points are spaced from each of the other contacting points by a distance of greater than zero. The separate lamella devices act in a force-fitting manner and increase the component count and therefore the production and installation costs.

DE 10 2018 009 921 A1 describes a flat plug connector arrangement with a flat contact, which has a blade contact portion, and with a mating plug connector, which has a contact spring pair, which is suitable for receiving the blade contact portion, and with spring arms for damping relative movements between the blade contact portion and the contact spring pair, wherein the spring arms are integrally formed in one piece on the long narrow sides of the flat contact and wherein end portions, designed as latching hooks, of the spring arms are displaceably mounted in a contact chamber.

A blade contact with a solder portion is presented in DE 10 2018 219 136 B3. The blade contact has at least one contact blade, which is designed for contacting a contact of a further plug connector and has a suction pad which is releasably arranged on the housing. The suction pad has at least one supporting portion on which the contact blade lies. The supporting portion serves to secure the contact blade during an installation or soldering procedure to prevent a displacement which may be brought about through the application of a pretensioning force, for example. The supporting portion forms, in particular, a stop on which the contact blade of the blade contact lies in order to prevent a movement of the contact blade in a form-fitting manner or to counteract a movement of the contact blade in a form-fitting manner. The supporting portion extends in the form of a web in the direction of the contact blade, wherein the contact blade and the supporting portion, as seen along their respective longitudinal extent, are arranged to overlap at the ends and lie against one another by means of lateral surfaces adjoining their respective free end faces.

A connector blade arresting device with a lamellar connector blade cross section is disclosed in DE 20 2009 015 602 U1. The contact blade has a plurality of contact fingers, which have, in a lamellar cross section extending transversely to the switching axis and in the direction of the mating direction, two spring portions leading away from a pivot point, wherein, in the inserted state of the contact blade in the mating contact, a first end portion of a first spring portion touches the mating jaws in such a way that the ratio between a second contact force on the second end portion to a first contact force on the first spring portion is proportional to the length ratios of the first spring portion to the second spring portion in accordance with the lever principle.

The prior art also includes form-fitting or force-fitting arresting solutions for flat plug contacts in contact fittings, which are secured against inadvertent or externally influenced disconnection or release of the mating connection by means of a tool.

DE 10 2014 211 101 A1 discloses a plug connector housing with at least one connection receiving chamber and at least one contact blade, which projects into the connection receiving chamber and which is moved out of the connection receiving chamber upon an elastic deformation of the contact blade, at least one connection, which may be inserted into the connection receiving chamber, wherein the connection has a connection contact part, which is formed on a front side thereof for contact with a matching connection, and an insert part, which is designed to engage with the contact blade, and a front holder, which is matched to a front part of the housing in order to be moved between an actual engagement position and a temporary engagement position, for the purpose of holding the connection contact part. During the insertion of the connection into the connection receiving chamber, the contact blade is elastically deformed in one direction so that it is moved out of the connection receiving chamber so that the connection may be inserted into the connection receiving chamber. When the connection is in a position in which the insertion of the connection into the connection receiving chamber is complete, the contact blade springs back elastically in order to engage with the engagement part. The housing is provided with an opening, which exposes an engagement point between the contact blade and the engagement part in a direction which is substantially perpendicular to an elastic deformation direction of the contact blade.

SUMMARY

An object of the invention is to improve the reliability and functionality of flat plug contacts, connector blades, contact blades or flat contact elements, to enable them to be arrested in the contacting position in a more reliable manner and to at least partially reduce the above-mentioned disadvantages.

To this end, the invention proposes a contact blade, connector blade, flat plug contact or flat contact element with at least one locking zone, which cooperates with at least one latching hook in the contact chamber in an arresting manner. The arresting action is achieved by latching the at least one locking zone to the at least one latching hook of the contact chamber.

The at least one locking zone of the flat contact element, which corresponds to the at least one latching hook of the contact chamber, is geometrically realized by at least one offset tongue, which is secured via a suitable holder or fastener, for example in the form of a tab. The tab with the offset tongue is secured on the contact blade and cooperates with a bead-like depression in a contact blade surface, so that the end of the tongue may be supported in the depression.

With the option of supporting the tongue in the bead-like depression, the invention achieves much greater deformation resistance or shape stability of the locking zone. Compared to a tongue without a support option, the offset tongue, with its curved design, may absorb significantly greater radial force components, or significantly greater radial forces are needed to deform the offset tongue in the radial direction and to release the arresting mechanism.

The at least one offset or curved tongue, as a primary component of the locking zone, may be formed by a laterally inwardly bent locking tab. The length of the tongue and the position of an associated bead-like depression within the flat side of the contact blade are matched to one another according to the invention in such a way that the tongue end may engage in the depression and may be supported there under an axial force on the flat contact element in the mating direction and especially under a tensile load.

With the structural improvement of the locking zone and the increased holding force in the arresting position, it is possible to absorb the eccentrically acting tensile forces which occur in a robust manner. Furthermore, the lateral tongue surface may be used functionally as a generous slide ramp for latching hooks and/or as an engagement surface for a release tool.

A further advantage consists in absorbing tensile forces via the wide stop zone of the offset tongue without resulting in plastic material deformations in the locking zone.

If two comparably dimensioned locking zones are realized, parallel and opposite, in the contact blade, it is possible to provide bilateral symmetrical stop shoulders for the defined stop of the plug contact during the insertion into the contact chamber.

Via the configuration and positional arrangement of the at least one locking zone with an offset tongue, it is also possible to promote a coded insertion orientation due to the geometrically imposed asymmetry.

BRIEF DESCRIPTION OF THE FIGURES

The invention is explained in more detail below with reference to a preferred exemplary embodiment in conjunction with the figures, in which.

DETAILED DESCRIPTION

Figure 1:
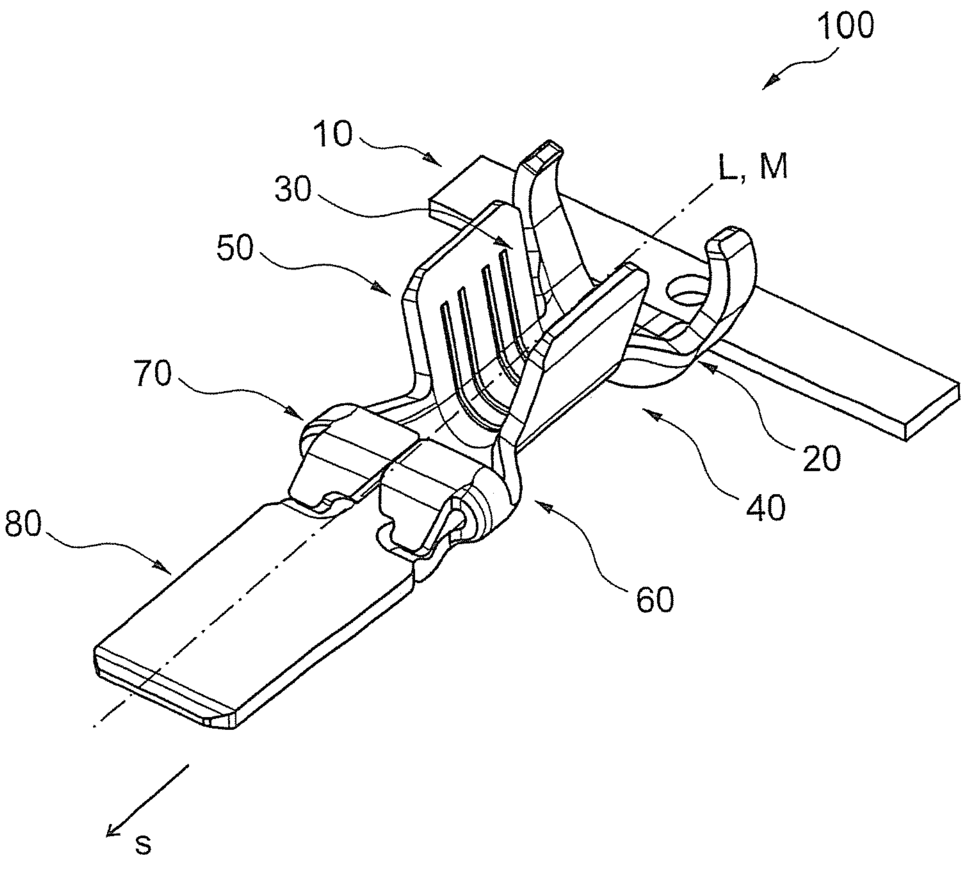
FIG. 1 shows a perspective view of an exemplary embodiment of a plug contact element with a contact blade and a locking zone.

FIG. 1 shows a perspective view of an exemplary embodiment of a plug contact element 100 with a contact blade 80 and a locking zone 70. The plug contact element 100 of this exemplary embodiment is based on a flat semi-finished product 100 and has various portions 10 to 50 and the contact blade 80, coupled to the plug contact element 100 via the connecting portion 60, with a locking zone 70. The locking zone 70 of this exemplary embodiment is arranged directly adjacent to the connecting portion 60 and therefore, in the mating direction S, behind the contact blade, connector blade, flat plug contact or flat contact element 80. The locking zone 70 is formed by a tongue 71, which cooperates with a bead-like depression 82. In the embodiment shown, the locking zone 70 is realized by two mutually parallel-arranged tongues 71, each with an associated bead-like depression 82.

Figure 2:
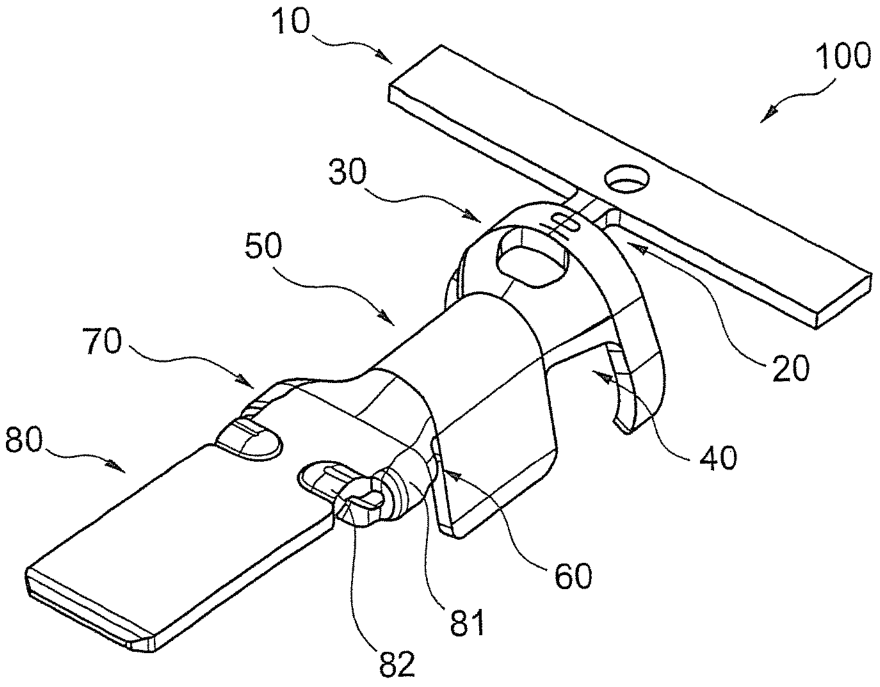
FIG. 2 shows a perspective, rear view of an exemplary embodiment of a plug contact element with a contact blade and a locking zone.

FIG. 2 shows the plug contact element 100 in a rear perspective view with the underside of the bead-like depressions 82 of the locking zone 70.

Figure 3:
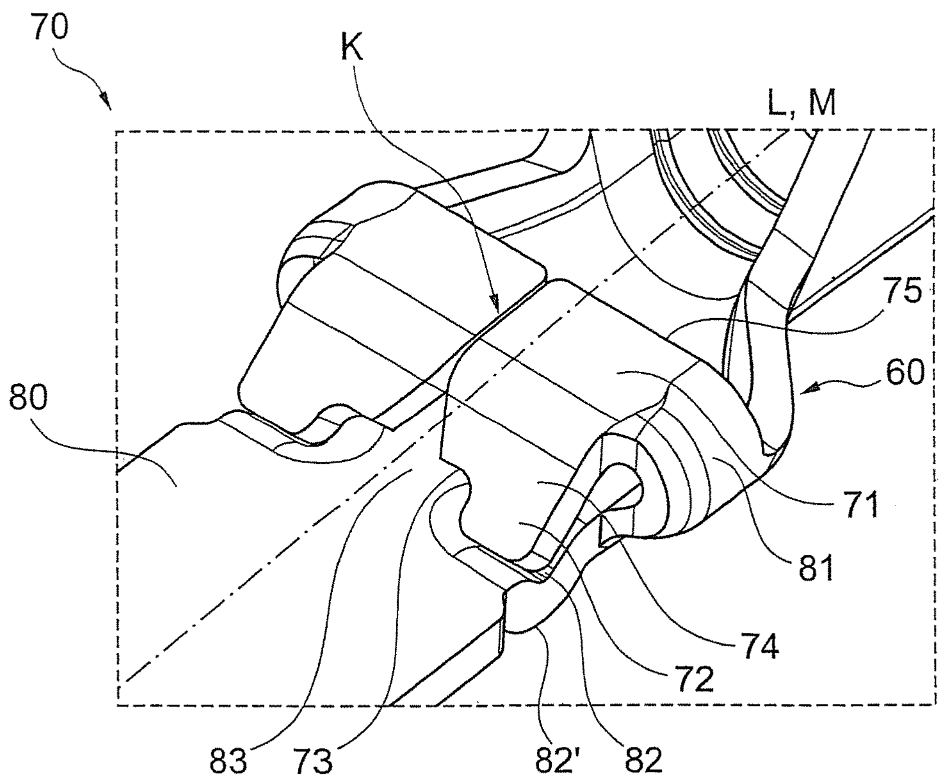
FIG. 3 shows, in a three-dimensional illustration, the region of the locking zone on the flat plug contact, flat contact element, contact blade or connector blade.

FIG. 3 shows, in a three-dimensional illustration, the region of the locking zone 70 on the flat plug contact, flat contact element, contact blade or connector blade 80, formed analogously to the previous figures here via the combination of two mutually parallel-arranged tongues 71, each with associated bead-like depressions 82.

According to the invention, the tongue 71 is coupled to the contact blade 80 via a tab 81. An embodiment in which the tongue 71, tab 81 and flat plug contact 80 are produced in one piece and from a semi-finished product 100', for example in a forming process, is shown here. By means of the tongue tip 72, the offset tongue 71 is supported in the bead-like depression 82, at least in the locked mating position of the plug contact element 100 within the mating contact partner or mating contact fitting, and thus increases the strength or shape stability against deformation. As a result of this construction, it is possible to support the tongue 71 with respect to locking forces at two points: the tab 81 and the bead-like depression 82. The locking force is thus significantly increased and the positional reliability in the locking position is improved.

The bead-like depression 82 may be produced using various techniques, for example by material removal in a cutting or eroding method. However, massive forming of the flat semi-finished product 100' is particularly suitable. In addition to the particularly desirable property of increasing the strength by material compaction in this region, a curved portion 82' is formed on the side opposite the depression 82, or rear side, which curved portion may cooperate with the locking mechanism of the contact chamber in a locking manner. By way of example, the locking mechanism of the contact chamber may be formed by one or more latching hooks, which reach behind the curved portion 82'. Another option consists in the contact chamber having a corresponding recess into which the curved portion 82' may reach.

The tongue tip 72 may be optionally reduced in width, for example 0.5 to 0.7 of the tongue width at the height of the tab 81. This geometrical design may be supplemented by a notch 73, so that the tongue tip 72 is only supported within the depression 82. The reduction in width of the tongue tip 72 promotes an increased elastic deformation behavior of the tongue 71 in this region and enables the bead-like depression to be shorter in the width direction of the contact blade 80 so that the depression 82 only extends over the width of the contact blade 80 in some regions and the adequate strength of the contact blade 80 in this region is thus ensured by the web 83 formed between the depressions 82.

The locking zone 70 of the exemplary embodiment of the invention which is illustrated in FIG. 3 is realized with two tongue/depression combinations. The arrangement is designed to be mirror symmetrical with respect to the center axis M in such a way that the tongues 71 lie against one another at a lateral contact surface K. As a result of this arrangement, in addition to the support provided for the respective tongue 71 at the tab 81 and at the depression 82, a third support option, involving mutual support, is realized. The third support at the contact surface K again increases the strength so that a further increase in the locking force is realized.

Figure 4:
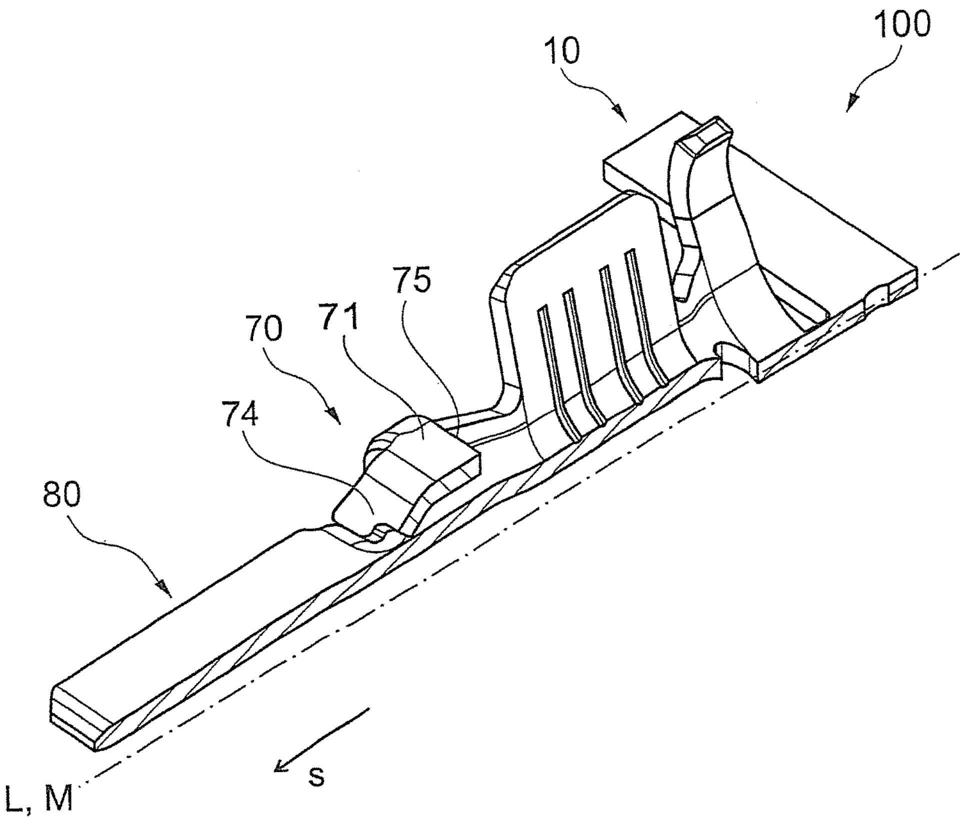
FIG. 4 shows the 3D longitudinal sectional view of a plug contact element with a contact blade and a locking zone.

FIG. 4 comprises the 3D longitudinal sectional view of a plug contact element 100 with a contact blade 80 and a locking zone 70. In order to show the cross section of the tongue 71 with its curved or offset contour, the section in this region is shifted slightly eccentrically, parallel to the handling portion 10. The offset tongue 71 is constructed with a chamfer in the mating direction S, so that a slide ramp 72 is formed.

Depending on the design of the contact chamber of the mating partner, this slide ramp 74 may be used to deflect a latching hook during the insertion movement or it may function as an engagement surface for a release tool. Alternatively or in addition to the mechanical locking function of the curved portion 82', the tongue edge 75 may cooperate with a locking mechanism of the contact chamber, for example one or more latching hooks, in a locking manner so that the plug contact element 100 is locked, i.e. held, in its mated contacting end position.

Figure 5:
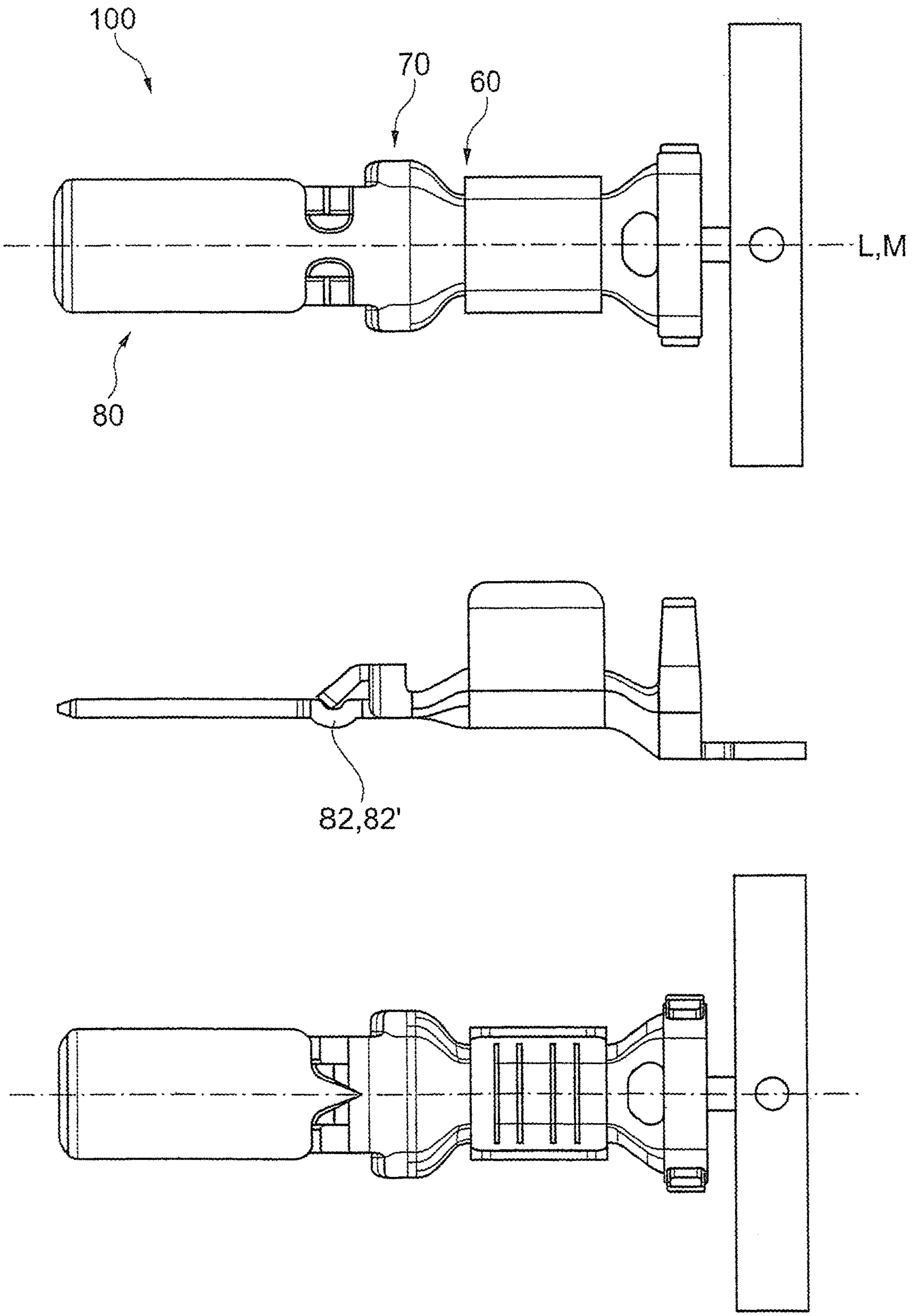
FIG. 5 shows an illustration of the plug contact element in three views.

FIG. 5 shows an illustration of the plug contact element 100 in three views. The top drawing shows the plug contact element 100 from its underside with the connector blade 80 and locking zone 70. The locking zone 70 is arranged adjacent to the third connecting portion 60. This geometrical design is advantageous both in that the usable connector blade length is very—or even maximally—long and very good rigidity of the plug contact element 100 in this portion may be achieved. The rigidity-increasing effect is based on the position of the tab 81 directly adjacent to the connecting portion 60 with its spatial contour. The middle drawing shows the plug contact element 100 in a side view. The bead-like depression 82 is curved on the side which is remote from the tongue 71 and, in addition to the tongue 71, as a component of the locking zone 70, may be used for the locking function by cooperating with, for example, a latching hook in the contact chamber of the mating partner. The bottom drawing shows the plug contact element 100 in a plan view.

Figure 6:
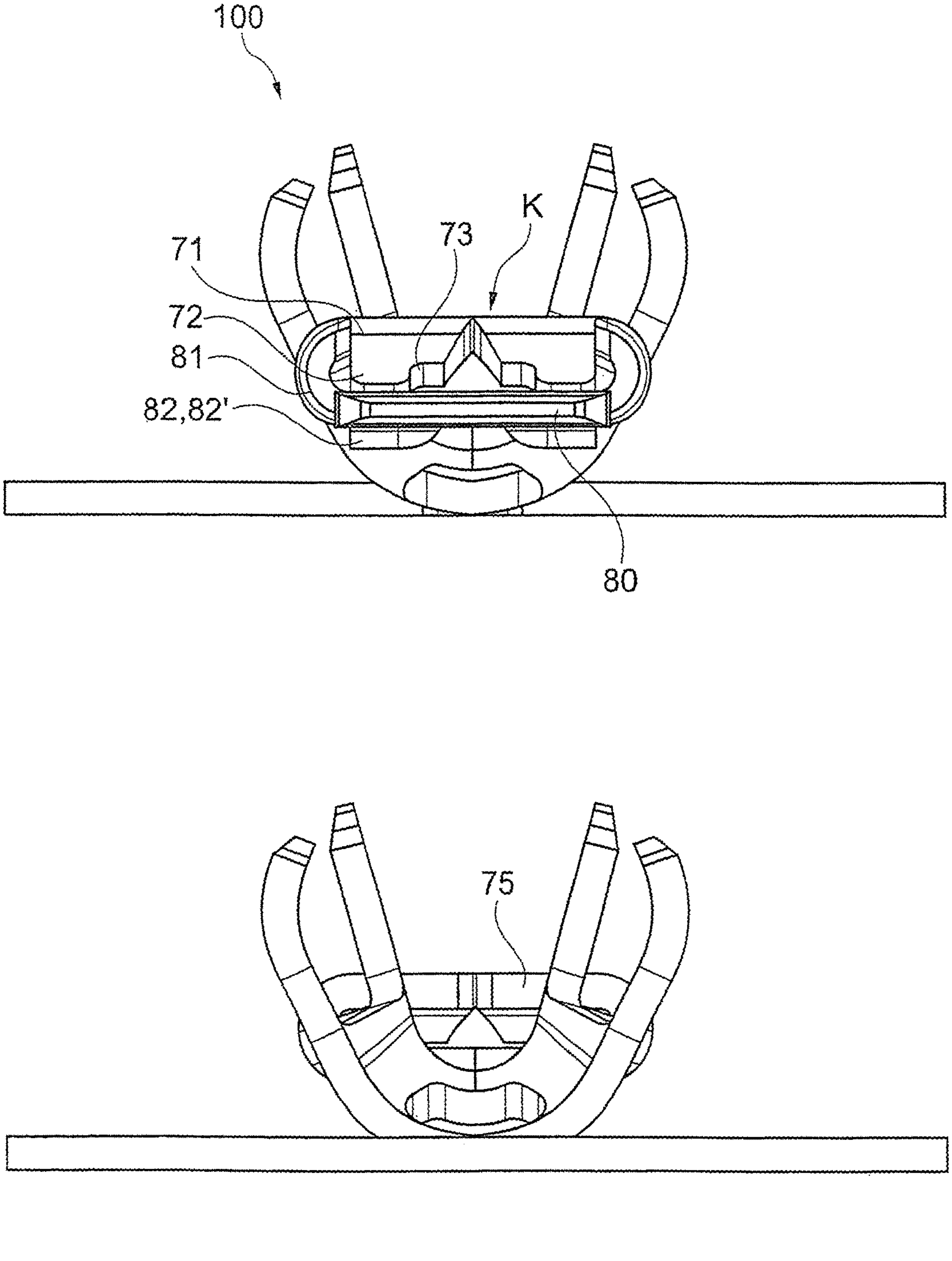
FIG. 6 shows end-face views of the plug contact element.

FIG. 6 shows the end-face views of the plug contact element 100 with its two locking components (selected purely by way of example and arranged symmetrically in this exemplary embodiment), which are formed by the respective pairing of a tongue 71 and a depression 82. The region in which the two tongues 7 touch at their contact surface K is congruent with the center axis M in this symmetrical configuration of the locking zone 70.

The invention claimed is:

1. A locking zone for a plug contact element with a contact blade for producing an electrically conductive connection, the locking zone comprising:

a first locking element; and a second locking element, wherein the first locking element comprises a tongue and the second locking element comprises a depression, wherein the first and second locking elements of the locking zone are geometrically matched to one another such that the tongue is configured to engage in the depression and is supported in the depression in a locking position of the plug contact element when engaged therewith, and wherein the depression is formed in a bead-like manner and has a curved portion on a side which is remote from the tongue.

2. The locking zone as claimed in claim 1, wherein the tongue is curved via an offset.

3. The locking zone as claimed in claim 1, wherein the tongue has a tongue tip, which may engage in the depression in a supporting manner.

4. The locking zone as claimed in claim 3, wherein the tongue tip has a width which is 0.5 to 0.7 of the maximum width of the tongue.

5. The locking zone as claimed in claim 1, wherein the tongue has a notch.

6. The locking zone as claimed in claim 1, wherein the tongue has a slide ramp.

7. The locking zone as claimed in claim 1, wherein the tongue has a tongue edge.

8. The locking zone as claimed in claim 1, wherein the tongue is secured on the contact blade by a tab.

9. The locking zone as claimed in claim 8, wherein the depression is arranged in certain areas of a contact blade surface, at an end of the contact blade and adjacent to a connecting portion and the tab, so that the tongue may engage in the depression in a supporting manner.

10. A plug contact element with at least one locking zone as claimed in claim 1.

11. The plug contact element as claimed in claim 10, wherein the plug contact element comprises two locking zones, which are arranged in a region of the contact blade, adjacent to the connecting portion.

12. The plug contact element as claimed in claim 11, wherein the two locking zones are arranged symmetrically and adjacent to one another.

13. The plug contact element as claimed in claim 11, wherein the tongues abut against one another at a contact surface.

14. The plug contact element as claimed in claim 11, wherein the depressions are incorporated in a contact blade surface and are spaced by a web.

* * * * *